United States Patent [19]
O'Neil et al.

[11] Patent Number: 6,079,671
[45] Date of Patent: *Jun. 27, 2000

[54] PASSIVE POROSITY AIRFOIL MANAGEMENT DEVICE

[75] Inventors: Patrick J. O'Neil, Florissant; Garrett M. Billman, Troy, both of Mo.

[73] Assignee: The Boeing Company, St. Louis, Mo.

[*] Notice: This patent is subject to a terminal disclaimer.

[21] Appl. No.: 09/072,300

[22] Filed: May 4, 1998

Related U.S. Application Data

[63] Continuation-in-part of application No. 08/444,548, May 19, 1995.

[51] Int. Cl.⁷ .................................................. B64C 21/02
[52] U.S. Cl. ........................................ 244/204; 244/208
[58] Field of Search .................................. 244/204, 205, 244/207–209, 130, 1 N, 210, 214

[56] References Cited

U.S. PATENT DOCUMENTS

| | | | |
|---|---|---|---|
| 1,499,064 | 6/1924 | Kuipers . | |
| 1,530,635 | 3/1925 | Adams . | |
| 2,077,071 | 4/1937 | Rose | 244/42 |
| 2,426,334 | 8/1947 | Banning | 244/41 |
| 3,794,274 | 2/1974 | Ekens | 244/204 |
| 4,516,747 | 5/1985 | Lurz | 244/204 |
| 4,522,360 | 6/1985 | Barnwell et al. | 244/204 |
| 4,575,030 | 3/1986 | Gratzer | 244/209 |
| 4,664,345 | 5/1987 | Lurz | 244/208 |
| 4,726,548 | 2/1988 | Clites | 244/209 |
| 5,167,387 | 12/1992 | Hartwich | 244/200 |
| 5,806,808 | 9/1998 | O'neil | 244/204 |

FOREIGN PATENT DOCUMENTS

| | | | |
|---|---|---|---|
| 1010419 | 6/1952 | France | 244/204 |
| 304973 | 1/1929 | United Kingdom | 244/204 |
| 2093152A | 8/1982 | United Kingdom | 244/198 |

OTHER PUBLICATIONS

Hsiung et al., Drag Reduction of Transonic Projectile by Porous Surface, AIAA–93–0417, Jan. 11–14, 1993, pp. 1–11.

Chen et al., Computation of Viscous Transonic Flow Over Porous Airfoils, AIAA–87–0359, Jan. 12–15, 1987, pp. 1–16.

Bauer et al., Alleviation of Side Force on Tangent–Ogive Forebodies Using Passive Porosity, AIAA–92–2711, Jun. 22–24, 1992, pp. 1–12.

Miller, A Novel Concept for Subsonic Inlet Boundary–Layer Control, *Journal of Aircraft*, vol. 14, No. 4, Apr., 1977, pp. 403–404.

Bahi et al., Passive Shock Wave/Boundary Layer Control for Transonic Airfoil Drag Reduction, AIAA–83–0137, Jan. 10–13, 1983. pp. 1–11.

Nagamatsu et al., Porosity Effect on Supercritical Airfoil Drag Reduction by Shock Wave/Boundary Layer Control, AIAA–84–1682, Jun. 1984, pp. 1–6.

Savu et al., Porous Airfoils in Transonic Flow, *AIAA Journal*, vol. 22, No. 7, Jul. 1984, pp. 989–991.

Savu et al., Analytical Solutions for Hypersonic Flow Over the Porous Surfaces, AIAA–93–5113, Nov. 30–Dec. 3, 1993, pps 1–5.

Hartwich et al., Experimental Study on Porous Transonic Airfoils with a View Toward Multipoint Design, AIAA–94–0500, Jan. 10–13, 1994, pp. 1–9.

*Primary Examiner*—Galen L. Barefoot
*Attorney, Agent, or Firm*—Bryan Cave LLP

[57] ABSTRACT

A passive porosity management device and process for an airfoil which provides a mechanism and method for controlling and modifying the lift, drag and flow field characteristics on an airfoil through the controlled seepage and transference of air utilizing passive porosity through one or more regions of an airfoil and into, and out of, one or more plenum cavities disposed in the interior portion of the airfoil.

20 Claims, 5 Drawing Sheets

PASSIVE POROSITY AIRFOIL MANAGEMENT DEVICE

This application is a continuation-in-part of pending U.S. application Ser. No. 08/444,548 filed on May 19, 1995 in the name of Patrick J. O'Neil which is hereby fully incorporated herein by this reference.

BACKGROUND OF THE INVENTION

1. Field of the Invention

The present invention relates generally to an airfoil management device and more particularly to the use of passive porosity in combination with (controlled transference and seepage of air through the skin of various regions of airfoils for use as lift and drag management devices.

2. Description of the Prior Art

Conventional non-porous airfoils typically utilize various mechanical structures, such as spoilers and associated structural and actuation hardware, in order to alter, vary and control the lift on an airfoil. Spoilers are typically comprised of at least one structural member which is movably connected to an airfoil, with various types of mechanical hardware, such that the structural member may be hydraulically, pneumatically, or otherwise mechanically raised into the airstream on at least one side of an airfoil in order to interrupt the air flow over the respective surface of the airfoil. Such devices are used to achieve a variety of objectives including, for example, to provide roll control, direct lift control, increased drag to facilitate greater engine power requirements (some engines have improved performance characteristics when operated at increased power levels), a reduction in altitude gain during aircraft landing (sometimes referred to as flap anti-ballooning), and to increase drag and reduce velocity (sometimes referred to as "air brakes").

Conventional hydraulic, pneumatic, and other mechanical devices (such as spoilers), including the structural and actuation hardware related thereto, utilized to alter, vary and control lift are subjected to various static and dynamic forces, loads, pressures, stresses, strain, wear, and fatigue which result in reducing the life and accelerated failure of the various components. Of course, as the structural and actuation hardware are fastened or otherwise affixed to the airfoil itself, the static and dynamic forces, loads, pressures, stresses, and strains which occur in or upon the structural components and actuation hardware are transferred or otherwise transmitted to portions of the airfoil itself resulting in wear, fatigue and a reduction in the useful life of the wing structure itself. Reducing or eliminating such forces and wear upon such components, and upon wings in general, would serve to increase the reliability, useful life, and safety of any aircraft, vehicles, or other devices which utilize conventional lift control mechanisms.

Conventional mechanical lift control mechanisms, such as spoilers, and their related structural components and actuation hardware, utilize a substantial amount of beneficial area and mass. The mass attributable to conventional mechanical lift control mechanisms result in decreased usable space, heavier crafts, decreased fuel efficiency, and increased loads. In airfoil applications, the efficient utilization of useable area and mass is extremely important. If the amount of area and mass required to employ lift control mechanisms, such as spoilers, could be partially or totally eliminated, such area and mass could be employed for other useful purposes such as, for example, additional or increased passenger or cargo capacity, fuel storage, instrumentation, or armament storage.

Through the use of passive porosity and the controlled seepage and transference of air through one or more surfaces on various regions of an airfoil, the present invention partially or completely eliminates the need for conventional mechanical lift and drag control mechanisms, such as spoilers, and most of the associated structures, actuation devices, support hardware, hydraulic systems, and other related components thereto, thereby increasing the amount of usable area and space on and in an airfoil, decreasing the number of required moving parts, decreasing the amount of mass necessary to achieve the results previously only performed by mechanical structures such as spoilers, and eliminating the various static and dynamic forces, loads, pressures, stresses, strain, wear, and fatigue which result from conventional mechanical lift control mechanisms. Additionally, as the present invention will partially or completely eliminate the mechanical disruption of airflow as accomplished by conventional spoilers, thereby partially or completely eliminating the need to physically maneuver mechanical spoiler structures into an airstream, the present invention will result in substantially improved acoustic signatures and decreased reflective surfaces.

The general use of porous skin regions on airfoils is disclosed in U.S. Pat. Nos. 5,167,387, 4,575,030, and 4,726,548. In an attempt to improve lift and drag characteristics at subcritical and supercritical conditions, U.S. Pat. No. 5,167,387 uses porous airfoil skin surfaces to vent air pressure from the leading edge region to the trailing edge region of an airfoil in order to alter the effective airfoil thickness. U.S. Pat. No. 4,575,030 uses active suction mechanisms in connection with porous airfoil skin surfaces in an attempt to control the laminar flow over an aircraft wing. U.S. Pat. No. 4,726,548 uses porous airfoil skin surfaces in an effort to draw boundary layer air into an airfoil and then evacuate such air at the end of the airfoil in order to improve drag characteristics. U.S. Pat. No. 2,077,071 discloses a boundary layer control mechanism for airfoils.

The disadvantages of the prior art are overcome by the present invention which uses passive porosity in combination with controlled seepage and transference of air through the skin on various regions of an airfoil for use as a lift and drag management device thereby partially or completely eliminating conventional mechanical components and systems for altering, varying and controlling lift and drag or enhancing the capabilities of the airfoil. Additionally, unlike the prior art, the present invention does not require that the air be vented from one plenum chamber to another, rather, the present invention has the unique ability to effect and control lift and drag on an airfoil by controlling the seepage and transference of air through one or more porous skin regions into and out of one or more corresponding plenum cavities. The present invention does not require that the air in one plenum cavity which is associated with a porous region be able to fluidly communicate with the air or air pressure in any other plenum cavity or any other porous region. The present lift management invention has the unexpected result of allowing for a decreased amount of moving parts, improved airfoil acoustic signatures, improved efficiency and reliability, increased performance characteristics, a decrease in the amount of mass necessary to achieve lift and drag management, and the elimination or reduction of separate control surfaces and related hardware required to achieve lift and drag management by conventional means. Further advantages of the present invention will be recognized by those skilled in the art.

SUMMARY OF THE INVENTION

The present invention is a lift and drag management device and process for an airfoil which provides a mechanism and method for controlling and modifying the lift and drag on an airfoil through the controlled seepage and transference of air utilizing passive porosity on one or more regions of an airfoil. The present invention preferably has one or more outer porous skin regions on the surface of one or more regions of an airfoil. The porous skin regions preferably have a plurality of perforations therethrough. Each of the porous skin regions are preferably capable of being in fluid communication with at least one corresponding upper plenum cavity disposed in the interior portion of the airfoil. In a preferred embodiment, air on one or more outer surfaces of the outer porous skin regions on the leading edge region of the airfoil will preferably cause, through the passive seepage and transmission of air through all or a portion of the perforations in the porous skin regions, certain air pressures and flow fields to develop in corresponding plenum cavities and on the outer surface of the airfoil. A portion of the air which enters the plenum cavities will exit the plenum cavities through all or a portion of the perforations in the corresponding porous skin regions.

The passive seepage and transmission of air in and out of the perforations in one or more porous skin regions on the surfaces of the airfoil, and in and out of corresponding plenum cavities, is preferably controlled so that: (i) the amount of seepage of air through the respective porous skin regions, or portions thereof; (ii) the flow field caused by the passive transmission of air in the corresponding plenum cavities; (iii) the flow fields and disturbances caused on the outside surfaces of the airfoil; may be regulated.

In one presently preferred embodiment of the present invention, a means for permitting and stopping the passive seepage and transference of air through the porous skin regions is preferably used. For example, in a preferred embodiment, one or more impermeable panels which are each connected to corresponding linear actuators are preferably employed inside the airfoil adjacent corresponding porous skin regions. In said preferred embodiment, when a linear actuator is extended, the impermeable panel preferably physically contacts the corresponding porous skin region on the interior surface of the airfoil thereby precluding air seepage and transference through the corresponding perforations and in and out of the corresponding plenum cavity. Similarly, when a linear actuator is retracted, the impermeable panel is not in physical contact with the corresponding porous skin region on the interior surface of the airfoil thereby permitting air seepage and transference through the corresponding perforations and in and out of the corresponding plenum cavity. In another preferred embodiment, one or more bladders are preferably employed inside the airfoil adjacent corresponding porous skin regions. When a bladder is inflated, the bladder preferably physically contacts the corresponding porous skin region on the interior surface of the airfoil thereby preferably precluding air seepage and transference through the corresponding perforations and in and out of the corresponding plenum cavity. Similarly, when a bladder is deflated, the bladder preferably is no longer in physical contact with the corresponding porous skin region on the interior surface of the airfoil thereby preferably permitting air seepage and transference through the corresponding perforations and in and out of the corresponding plenum cavity.

Other preferred embodiments of a means for permitting and stopping the passive seepage and transference of air through the porous skin regions include, for example, employing the use of moveable pins, plates, and/or membranes which are aligned with corresponding perforations in the porous skin region of the airfoil and which may be moved to preclude or permit air seepage and transference through said perforations. Another preferred embodiment employs the use of a material which, when actuated or de-actuated, itself opens and closes the perforations in the porous skin region. As is described more fully herein, and as will be appreciated by persons of ordinary skill in the art, there are innumerable embodiments and variations of the present invention for permitting or precluding air from entering or exiting through the perforations, or opening or closing the perforations, of corresponding porous skin regions. Additionally, the present invention is not limited to only permitting or precluding air from entering or exiting an entire porous skin region, but, rather, also encompasses the flexibility of permitting air to enter and exit one or more portions of a porous skin region, or specific perforations, while precluding air from entering or exiting one or more other areas of the porous skin region or other perforations.

The present invention preferably further comprises a means for controllably monitoring and regulating the passive seepage and transference of air through selective airfoil surface regions, perforations in the porous skin surfaces, and in and out of corresponding plenum cavities, in order to preferably control, reduce, modify, vary or otherwise effect flow fields, air disturbances, and the lift and drag on an airfoil.

BRIEF DESCRIPTION OF THE DRAWINGS

To facilitate further description of the invention, the following drawings are provided in which.

These drawings are provided for illustrative purposes only and should not be used to unduly limit the scope of the invention.

DETAILED DESCRIPTION OF THE PREFERRED EMBODIMENT

Figure 1:
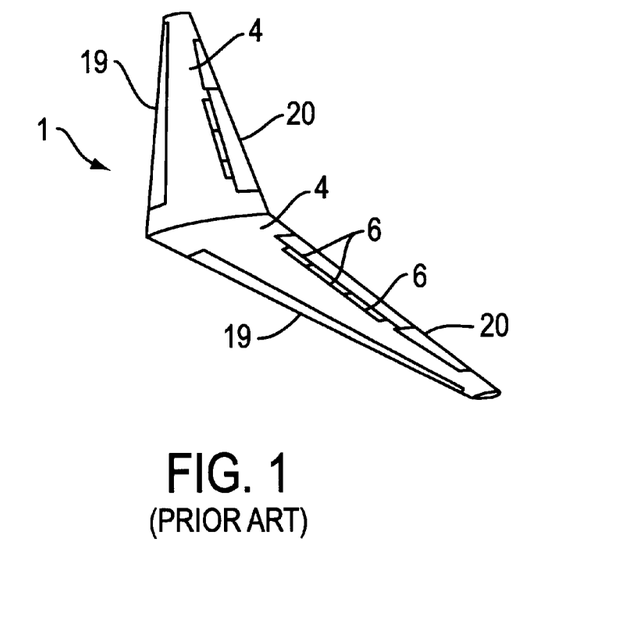
FIG. 1 is a perspective view of the upper surfaces of a conventional prior art aircraft wing.
Figure 2:
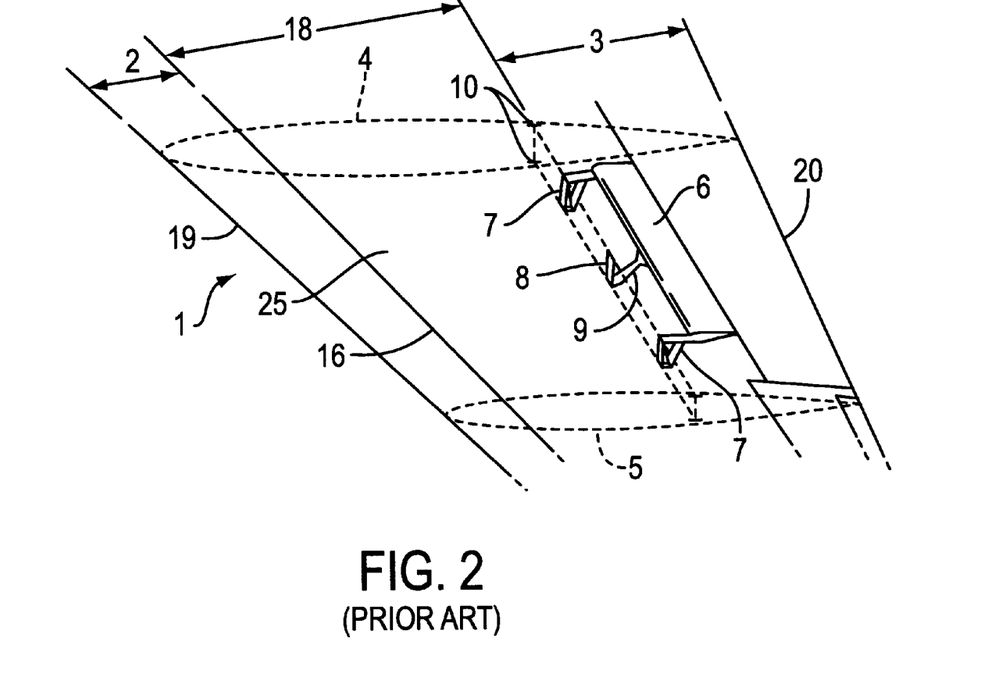
FIG. 2 is a cutaway perspective view of a prior art spoiler used on a conventional aircraft wing.
Figure 3:
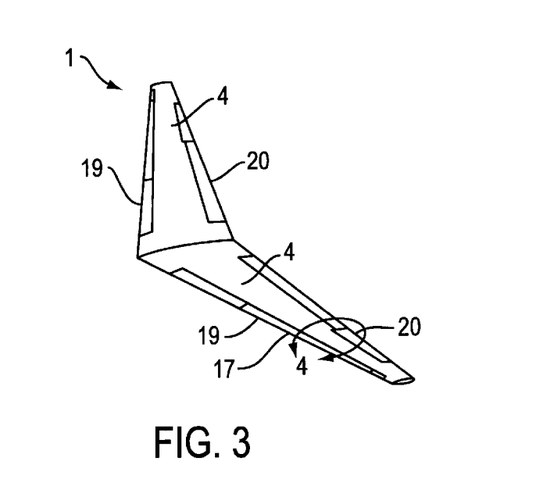
FIG. 3 is a perspective view similar to FIG. 1, of the upper surfaces of an aircraft wing incorporating a preferred embodiment of the present invention.

Referring now to the drawings, and more particularly to FIGS. 1 and 2, a conventional airfoil 1, such as those used on aircraft, is composed of three primary regions, a leading edge region 2 which extends chordwise from the leading edge 19 of the airfoil 1 to the front spar 16, a trailing edge region 3 which extends chordwise from the aft spar 10 to the trailing edge 20 of the airfoil 1, and a wing box region 18 which extends chordwise from the front spar 16 to the aft spar 10 of the airfoil 1.

Conventional airfoils, such as aircraft typically employ, utilize at least one mechanical structure, such as spoilers 6 (FIG. 2), in order to alter, vary and control the airflow on the upper surface 4 of the airfoil 1. As shown in FIGS. 1 and 2, spoilers 6 are commonly employed on the trailing edge region 3 of an airfoil 1. Such devices are used to achieve a variety of objectives including, for example, to provide roll control, direct lift control, increased drag to facilitate greater engine power requirements (some engines provide improved performance characteristics when operated at increased power levels), a reduction in altitude gain during aircraft landing (sometimes referred to as flap anti-ballooning), and to increase drag and reduce velocity (sometimes referred to as "air brakes"). When employed, spoilers 6 are typically pivotally raised into the airstream over the upper surface 4 of an airfoil 1 thereby disrupting the airflow over the upper surface 4 of an airfoil 1 causing an increase in the air pressure on the upper surface 4 relative to the lower surface 5 of an airfoil 1, resulting in a reduction in lift. At all other times, when not employed, spoilers 6 typically remain in relative linear alignment with the upper surface 4 of an airfoil 1. Spoilers 6 are movably connected to the airfoil 1 with various types of mechanical hardware such that the spoilers 6 may be mechanically/electrically, hydraulically, or pneumatically raised into the airstream on the upper surface 4 in order to interrupt the air flow over the upper surface 4 of an airfoil 1. As shown in FIG. 2, in order to movably connect spoilers 6 to an airfoil, for example, spoiler support brackets 7, actuators 9, spoiler actuator supports, bracing structures, pivot components, operational controls, fastening hardware, and additional hardware must be utilized. Additionally, where hydraulic or pneumatic actuation systems are employed, hydraulic hoses, fluids, couplings, valves, monitors, and instrumentation are required. Likewise, if a mechanical/electrical actuation system is used, in addition to the mechanical components, electrical circuitry, wiring, and instrumentation would be required. When employed, conventional spoilers 6, including the related structural, mechanical, and actuation hardware, as well as the structural portions of the airfoil 1 itself to which such components are fastened, are subjected to various static and dynamic forces, loads, pressures, stresses, strain, wear, and fatigue which result in reducing the life of the various components and accelerated failure.

The present invention uses passive porosity in combination with controlled seepage and transference of air through the skin of an airfoil 1 on one or more regions of an airfoil 1 for use as a lift, drag and air flow management device thereby partially or completely eliminating conventional mechanical components and systems for altering, varying and controlling lift, drag and roll, or enhancing the capabilities of the airfoil, and to improve airfoil acoustic signatures, improve airfoil efficiency and reliability, increase performance characteristics, decrease the amount of mass necessary to achieve lift, drag and roll management, and eliminate or reduce the need for separate control surfaces and related hardware required to achieve lift, drag and roll management by conventional means.

Figure 4:
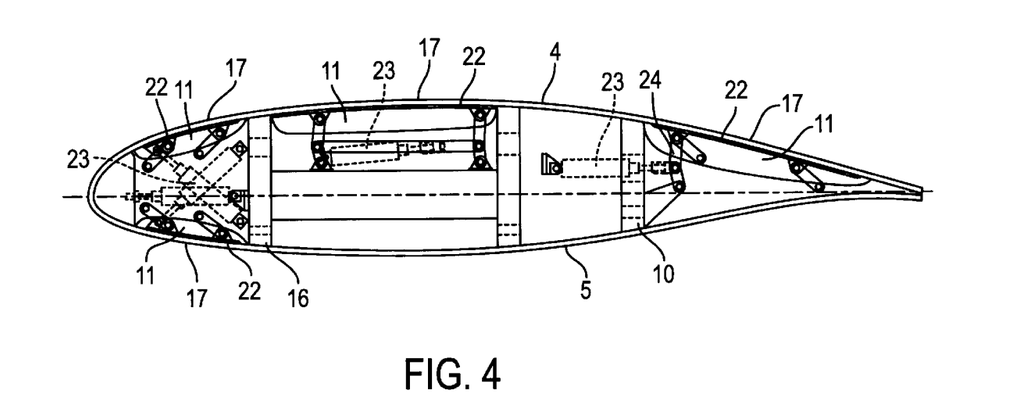
FIG. 4 is a cut-away cross-sectional view of the aircraft wing of FIG. 3 utilizing a preferred embodiment of the present invention.
Figure 5:
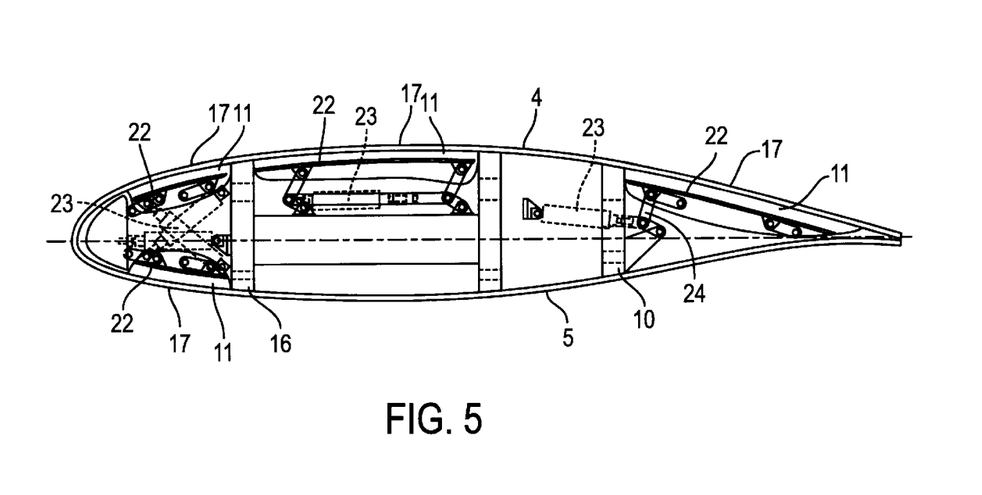
FIG. 5 is a cut-away cross-sectional view of the aircraft wing of FIG. 3 utilizing a preferred embodiment of the present invention.
Figure 6:
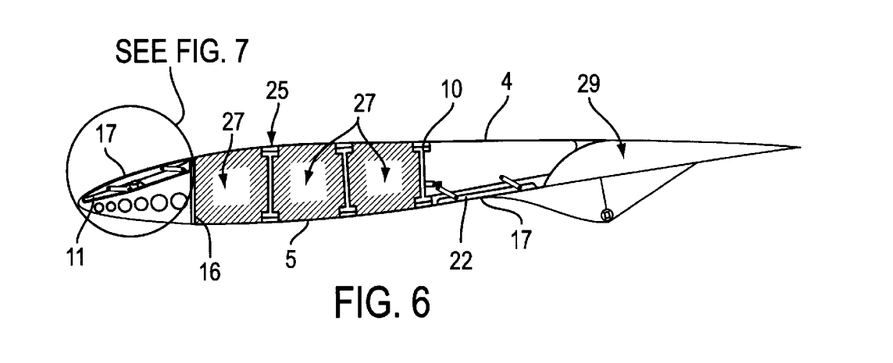
FIG. 6 is a cross sectional view an aircraft wing utilizing a preferred embodiment of the present invention.
Figure 7:
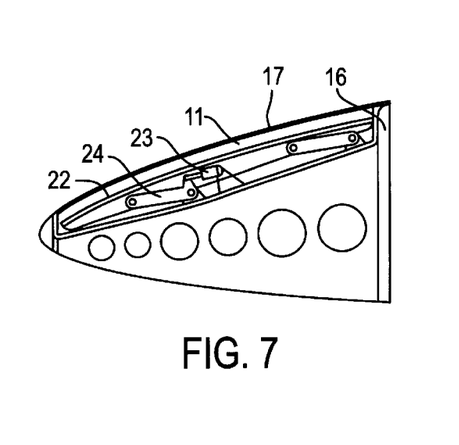
FIG. 7 is a blow-up of the leading edge portion of the aircraft wing of FIG. 6 utilizing a preferred embodiment of the present invention.
Figure 8:
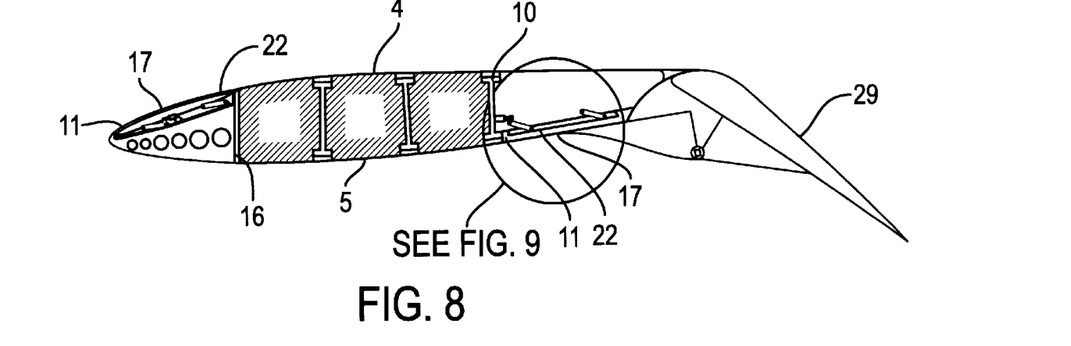
FIG. 8 is a cross-sectional view of the aircraft wing of FIG. 6 utilizing a preferred embodiment of the present invention.
Figure 9:
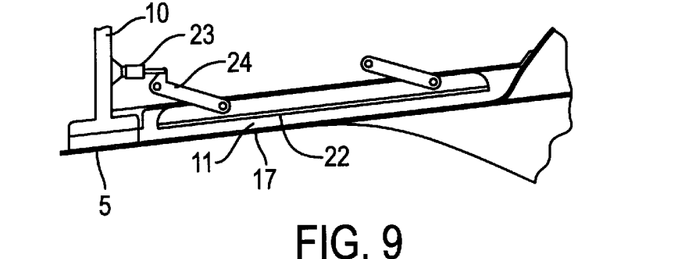
FIG. 9 is a blow-up of the trailing edge port ion of the aircraft wing of FIG. 8 utilizing a preferred embodiment of the present invention.

In a presently preferred embodiment of the invention, as shown in FIGS. 4–5, preferably, a plurality of outer porous skin regions 17 are employed on the upper surface 4 and lower surface 5 of the airfoil 1 and said outer porous skin regions 17 preferably having a plurality of perforations 8 therethrough. The corresponding interior portions of the airfoil 1, of a preferred embodiment of the invention, preferably have at least one plenum cavity 11 corresponding to respective outer porous skin regions 17 on the upper surface 4 and lower surface 5 of the airfoil 1. In a presently preferred embodiment, a plurality of either, or both, upper and lower outer porous skin regions 17 are preferably located, as shown in FIGS. 4 and 5, forward of the front spar 16 on the upper surface 4 and lower surface 5 on the leading edge region 2 of the airfoil 1. Similarly, in a preferred embodiment, a plurality of either, or both, upper and lower outer porous skin regions 17 are preferably located, as shown in FIGS. 4 and 5, behind the front spar 16 on either or both the upper surface 4 and lower surface 5 on the wing box region 18 of the airfoil 1. Additionally, in a preferred embodiment, a plurality of either, or both, upper and lower outer porous skin regions 17 are preferably located, as shown in FIGS. 4 and 5, on either or both the upper surface 4 and lower surface 5 in the trailing edge region of the airfoil 1. As will be appreciated by those skilled in the art, the present invention may employ any combination or number of upper and lower outer porous skin regions 17 located on any or all of the regions, including the leading edge region 2, wing box region 18, and the trailing edge region 3, of an airfoil 1.

In a preferred embodiment, air outside of the airfoil 1 on a portion or all of an outer porous skin region 17 will preferably cause, through the passive seepage and transmission of air through all or a portion of the perforations 8 in the outer porous skin region 17, air pressures and flow fields to develop and change in a corresponding plenum cavity 11.

Air which enters the plenum cavity 11 through perforations 8 will cause air to exit the plenum cavity 11 through all or a portion of the perforations 8 in the corresponding outer porous skin region 17. Preferably, the passive seepage and transmission of air through one or more outer porous skin regions 17, and into and out of the corresponding plenum cavities 11, will result and cause certain flow fields and flow disruptions to occur on the outer surface of the airfoil in, and in some cases beyond, the boundary layer of the outer porous skin region 17 and on certain areas adjacent to the outer porous skin region 17. Depending upon the location and shape of an outer porous skin region 17 on an airfoil 1, the resulting flow fields and flow disruptions caused by the passive seepage and transmission of air through the outer porous skin region 17 and into and out of a corresponding plenum cavity 11 results in either an increase or decrease in lift and/or drag on the applicable segment of the airfoil 1.

The passive seepage and transmission of air in and out of the perforations 8 in one or more outer porous skin regions 17 on the surfaces of the airfoil 1, and in and out of corresponding plenum cavities 11, is preferably controlled so that: (i) the amount of seepage of air through the respective outer porous skin regions 17, or portions thereof; (ii) the flow field caused by the passive transmission of air in the corresponding plenum cavities 11; (iii) the flow fields and disturbances caused on the outer porous skin regions 17 and on adjacent areas of the outer surface of the airfoil 1; may be regulated thereby facilitating the ability to control the effect upon lift and drag caused by the passive porosity system of the present invention.

Figure 12A:
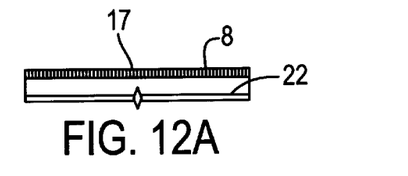
FIG. 12 is cut-away cross-sectional view of a preferred embodiment of a means for permitting and stopping the passive seepage and transference of air through a porous skin regions of an airfoil.
Figure 12B:
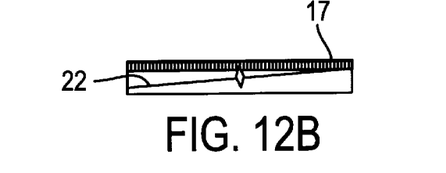

In one presently preferred embodiment of the present invention, a means for permitting and stopping the passive seepage and transference of air through an outer porous skin region 17 is preferably used. In one preferred embodiment, as shown in FIGS. 4–9, one or more impermeable panels 22 are each connected to a link 24 which link 24 is then connected to a linear actuator 23. The linear actuators 23 are preferably employed inside the airfoil 1 adjacent corresponding impermeable panels 22. In a preferred embodiment, when a linear actuator 23 is extended, as shown in FIG. 4, the impermeable panel 22 preferably physically contacts the corresponding porous skin region on the interior surface of the airfoil 1 thereby precluding air seepage and transference through the corresponding perforations 8 and in and out of the corresponding plenum cavity 11. The perforations 8 are thereby closed off at the site of the perforations 8. Similarly, when a linear actuator 23 is retracted, as shown in FIG. 5, the impermeable panel 22 is preferably pulled away from the porous skin region and is no longer in physical contact with the corresponding porous skin region and perforations 8 on the interior surface of the airfoil 1 thereby permitting air seepage and transference through the corresponding perforations 8 and in and out of the corresponding plenum cavity 11. Of course, the linkage and linear actuator 23 may be configured such that the impermeable panel 22 will stop the seepage of airflow through the corresponding porous skin region when the linear actuator 23 is retracted and, accordingly, permit the seepage of airflow when the linear actuator 23 is extended. An alternative embodiment of an impermeable panel 22 of the present invention is shown in FIG. 12(a) and (b). In this arrangement, the impermeable panel 22 may be actuated from a flow state, as shown in FIG. 12(a), to a non-flow state, as shown in FIG. 12(b).

Figure 10A:
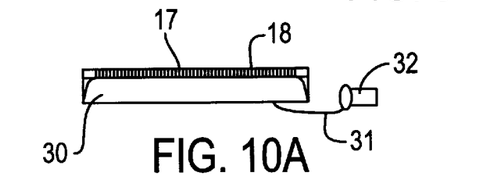
FIG. 10 is cut-away cross-sectional view of a preferred embodiment of a means for permitting and stopping the passive seepage and transference of air through a porous skin regions of an airfoil.
Figure 10B:
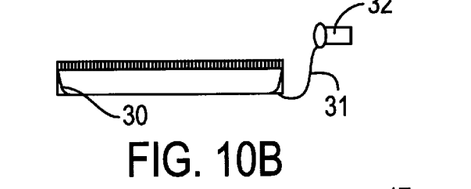

In another preferred embodiment, as shown in FIG. 10(a) and (b), one or more internal bladders 30 are preferably employed inside the airfoil 1 adjacent corresponding porous skin regions. The bladder is preferably connected to a hose 31 which is connected to a pump 32, such that said pump 32 may inflate or deflate the bladder 30. Preferably, when a bladder 30 is inflated, as shown in FIG. 10(a), the bladder 30 preferably physically contacts the corresponding porous skin region and applicable perforations 8 on the interior surface of the airfoil 8 thereby preferably precluding air seepage and transference through the corresponding perforations 8 and in and out of the corresponding plenum cavity 11. Similarly, when the bladder 30 is deflated, as shown in FIG. 10(b), the bladder 30 preferably moves away from the porous skin region such that it is no longer in physical contact with the corresponding porous skin region on the interior surface of the airfoil 1 thereby preferably permitting air seepage and transference through the corresponding perforations 8 and in and out of the corresponding plenum cavity 11.

Figure 11:
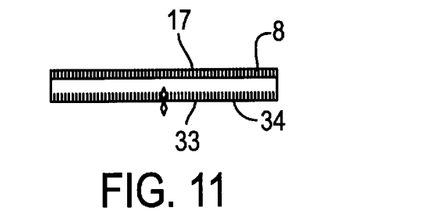
FIG. 11 is cut-away cross-sectional view of a preferred embodiment of a means for permitting and stopping the passive seepage and transference of air through a porous skin regions of an airfoil.

In another preferred embodiment, as shown in FIG. 11, pins 34 are affixed to a plate 33 which may be activated to move towards or away from the corresponding porous skin region. The pins 34 are preferably aligned with corresponding perforations 8 in the porous skin region such that when the plate 33 is activated to move towards the porous skin region, the pins 34 either plug or cover the corresponding perforations 8 thereby preferably precluding air seepage and transference through the corresponding perforations 8 and in and out of the corresponding plenum cavity 11. It will also be appreciated by those skilled in the art that the present invention may be employed to control the seepage and transference of air through a single perforation 8, any combination of perforations 8, or any specific area of a porous skin region.

Figure 16:
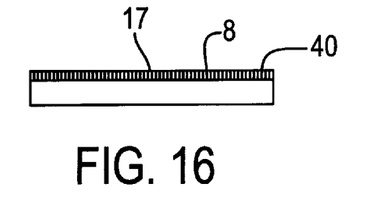
FIG. 16 is cut-away cross-sectional view of a preferred embodiment of a means for permitting and stopping the passive seepage and transference of air through a porous skin regions of an airfoil.

Another preferred embodiment of the present invention is shown in FIG. 16 which shows the use of a material 40 which itself has perforations 8 which, when actuated or deactuated, itself opens and closes its perforations 8. Said material 40 may be actuated or deactuated through activation means known by those skilled in the art including, for example, energized by electricity, magnetism, heat, cold, or the another energy source.

Figure 13:
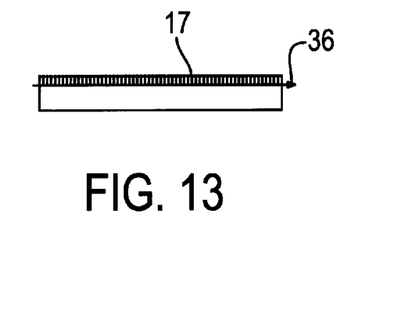
FIG. 13 is cut-away cross-sectional view of a preferred embodiment of a means for permitting and stopping the passive seepage and transference of air through a porous skin regions of an airfoil.
Figure 14:
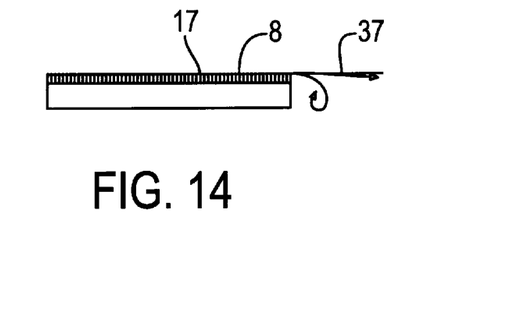
FIG. 14 is cut-away cross-sectional view of a preferred embodiment of a means for permitting and stopping the passive seepage and transference of air through a porous skin regions of an airfoil.
Figure 15:
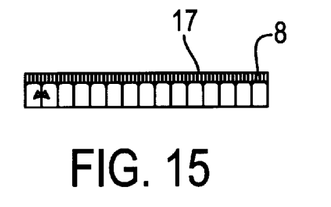
FIG. 15 is cut-away cross-sectional view of a preferred embodiment of a means for permitting and stopping the passive seepage and transference of air through a porous skin regions of an airfoil.
Figure 17:
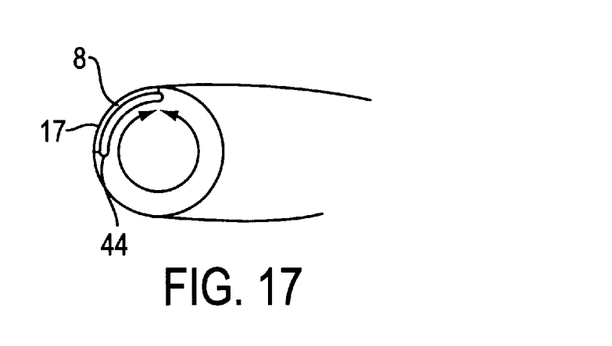
FIG. 17 is cut-away cross-sectional view of a preferred embodiment of a means for permitting and stopping the passive seepage and transference of air through a porous skin regions of an airfoil.
Figure 18:
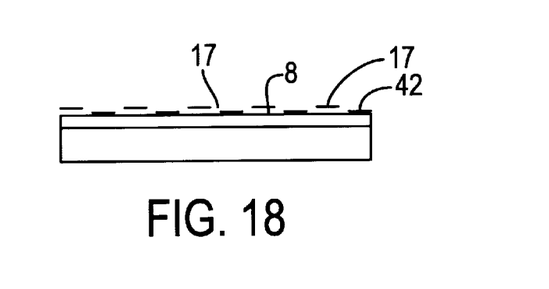
FIG. 18 is cut-away cross-sectional view of a preferred embodiment of a means for permitting and stopping the passive seepage and transference of air through a porous skin regions of an airfoil.

Additional preferred embodiments for controlling passive seepage and transference of air through the porous skin regions are shown in FIGS. 13, 14, and 17. FIG. 13 shows the employment of the use of a sliding sub-skin 36 of the present invention below the surface of the outer porous skin region. When the sliding sub-skin 36 is shifted, the perforations 8 are preferably opened and permit the seepage and transference of air through the perforations and into and out of the plenum cavity 11. Similarly, FIG. 14 shows the employment of an outer sliding skin 37 which works in the same manner as the sub-skin 36, however, the sliding skin is on the outer surface of the airfoil 1. FIG. 17 shows the use of a rotating surface 44 of the present invention which may be employed when a porous skin region of the present invention is located on a surface having a radius. The rotating surface 44, as shown in FIG. 17, may be rotatably moved to cover the perforations 8 of the porous skin region to preclude the seepage and transference of air through the perforations 8, or, alternatively, rotated such that seepage and transference may occur. FIG. 18 reflects the use of a sliding segmented sub-skin 42 of the present invention which, when shifted, the perforations 8 are preferably opened and permit the seepage and transference of air through the perforations and into and out of the plenum cavity 11. As will be appreciated by persons of ordinary skill in the art, there are innumerable embodiments and variations of the present invention for permitting or precluding air from entering or exiting through the perforations 8, or opening or closing the perforations 8, in corresponding porous skin regions.

The present invention preferably further comprises a means for monitoring and controllably regulating the passive seepage and transference of air through selective airfoil surface regions, perforations in the porous skin surfaces, and in and out of corresponding plenum cavities, in order to preferably control, reduce, modify, vary or otherwise effect flow fields, air disturbances, and the lift and drag on an airfoil 1.

Pressure and/or flow monitoring sensors in plenum cavities 11 or on respective upper surface 4 and lower surface 5 regions, are preferably connected to a microprocessor, artificial intelligence, or similar device, in order to accurately monitor air pressures, velocities and/or flows, and control the passive transfer of air through perforations 8 and in and out of plenum cavities 11. The air pressures, velocities and/or flow developed in respective plenum cavities 11 and on the outer surface of the airfoil 1 may preferably be determined by sensors producing outputs or signals which may be correlated by the microprocessor, artificial intelligence, or similar device, to determine, track and control the desired effect on the upper and lower surfaces 4 and 5.

In the present invention, the types of airfoils utilized and the desired applications and objectives will be useful in determining the quantity and location of upper and lower plenum cavities 11 utilized and the locations on the upper surface 4 and lower surface 5 upon which outer porous skin regions 17 should be located. Additionally, such factors will also effect the manipulation and manner of actuating and modulating the passive seepage and transference of air in a particular embodiment to achieve the advantages and results desired of the present invention.

As will be further appreciated by those skilled in the art, depending upon the application and desired effect upon the lift, drag, roll, and control of a particular airfoil, numerous variations, combinations, and locations of a plurality of porous skin regions 17 and upper and lower plenum cavities 11 of the present invention may be utilized to achieve a variety of varying results. For example, depending upon the application, if a desired result of the present invention is to control roll, it may be preferable to locate the outer porous skin regions 17 closer to the tip of the leading edge 19 of the wing. If a spoiler effect is desired, depending upon the type and magnitude of spoiler effect desired, it may be preferable to incorporate outer porous skin regions 17 over a larger portion of the upper and lower surfaces, 4 and 5, of the leading edge region 2. It may also be desirable to correspond a plurality of porous skin regions 17 on the upper surface 4 with a lesser number of porous skin regions 17 on the lower surface 5, or the reverse. Furthermore, it may be preferable to vary the sizes, locations, types and combinations of porous skin regions 17 and upper and lower plenum cavities 11.

As will be appreciated by those skilled in the art, in such a preferred embodiment, any combination of perforations 8 and/or porous skin regions may preferably be opened, closed, or modulated at any one time in a multiplicity of combinations in order to control lift or drag by, for example, influencing the air flow over an area of the outer porous skin regions 17 on the upper surface 4 in a uniform manner, influencing the air flow over an area in a predefined inharmonic manner, interrupting flow in a serial manner, or manipulating the lift and drag characteristics to reduce or increase altitude gain and/or speed. Of course, the variations that may be obtained with respect to the actuation of independent perforations or porous skin regions, or portions thereof, the configuration and location of corresponding outer porous skin regions 17, the configuration and location of corresponding plenum cavities 11, and the duration of actuation or modulation of such features, are relatively limitless. Additional examples of uses and variations of the present invention include, for example, (a) the actuation of only a single outer porous skin region independently in order to achieve certain roll or pitch control characteristics by altering the flow characteristics on a specific portion of the leading edge region 2 of an airfoil 1, (b) the actuation of a selected set of perforations 8 or outer porous skin regions in order to achieve certain desired roll, pitch or yaw control, (c) the actuation and modulation perforations 8 or outer porous skin regions in a selected order and duration in order to obtain roll, pitch, yaw, or other desired characteristics through lift and/or drag control, (d) the actuation of certain or all perforations or outer porous skin regions based upon predetermined specific parameters relating to air flow changes experienced on the upper 4 and lower 5 surfaces of an airfoil 1, (e) the actuation of certain or all perforations or outer porous skin regions based upon such variables as velocity, flow, altitude, temperature, density, pressure, time, humidity, mass, or other variables, which may effect the characteristics desired, and (f) the actuation of certain all perforations or outer porous skin regions in order to decrease lift, increase drag, or to facilitate greater engine power requirements.

As will be appreciated by those skilled in the art, the present invention is applicable to most applications where it is desirable to control, reduce, modify, vary or otherwise effect lift or drag on an airfoil including, by way of example, commercial aircraft, military aircraft, personal aircraft, high performance automobiles, high performance water craft, helicopters, and hydrofoils.

Variations and modifications of the present invention will be apparent to those skilled in the art and the claims are intended to cover any variations and modifications falling within the true spirit and scope of the invention.

I claim:

1. A passive porosity management device for an airfoil, the airfoil having an outer surface and an interior surface, the passive porosity management device comprising:

an outer porous skin region on the outer surface of the airfoil, the outer porous skin region having a plurality of perforations therethrough;

a plenum cavity disposed in the interior of the airfoil in fluid communication with corresponding outer porous skin regions of the airfoil;

means for precluding fluid communication, and the seepage and transference of air, through the outer porous skin region and in and out of the corresponding plenum cavity;

means for monitoring the amount of fluid communication, and the seepage and transference of air, through the outer porous skin region and in and out of the corresponding plenum cavity; and means for controlling the means for precluding fluid communication, and the seepage and transference of air, through the outer porous skin region and in and out of the corresponding plenum cavity.

2. The passive porosity management device for an airfoil according to claim 1 wherein said means for precluding fluid communication, and the seepage and transference of air, through the outer porous skin region and in and out of the corresponding plenum cavity, is comprised of:
  an impermeable panel disposed in the interior of the airfoil adjacent to the outer porous skin region of the airfoil;
  a linear actuator; and
  a link attachably connecting the impermeable panel to the linear actuator; whereby when the linear actuator is activated in one direction the impermeable panel contacts the interior of the airfoil adjacent to the corresponding outer porous skin region of the airfoil thereby precluding fluid communication and the seepage and transference of air through the outer porous skin region and in and out of the corresponding plenum cavity, and when the linear actuator is activated in the opposite direction, the impermeable panel moves away from the outer porous skin region of the airfoil thereby permitting fluid communications and the seepage and transference of air through the outer porous skin region and in and out of the corresponding plenum cavity.

3. The passive porosity management device for an airfoil according to claim 1 wherein said means for precluding fluid communication, and the seepage and transference of air, through the outer porous skin region and in and out of the corresponding plenum cavity, is comprised of:
  an inflatable bladder disposed in the interior of the airfoil adjacent to the outer porous skin region of the airfoil;
  a pump; and
  a hose having a distal end and a proximal end, the distal end of the hose being fixably attached to the inflatable bladder and the proximal end fixably attached to the pump;
whereby when the pump is energized to force fluid into the bladder, the bladder expands and contacts the interior of the airfoil adjacent to the outer porous skin region of the airfoil thereby precluding fluid communication and the seepage and transference of air through the outer porous skin region and in and out of the corresponding plenum cavity, and when the pump is energized to withdraw fluid from the bladder, the bladder deflates and moves away from the outer porous skin region of the airfoil thereby permitting fluid communication and the seepage and transference of air through the outer porous skin region and in and out of the corresponding plenum cavity.

4. The passive porosity management device for an airfoil according to claim 1 wherein said means for precluding fluid communication and the seepage and transference of air through the outer porous skin region, and in and out of the corresponding plenum cavity, is comprised of:
  a plurality of pins disposed in the interior of the airfoil adjacent to the outer porous skin region of the airfoil, wherein each of the pins are aligned with a corresponding perforation in the corresponding outer porous skin region; and
  a means to advance and retract the pins to and away from the outer porous skin region of the airfoil;
whereby when the pins are advanced towards the interior surface of the airfoil, the pins preclude fluid communication and the seepage and transference of air through the outer porous skin region, and in and out of the corresponding plenum cavity, and when the pins are moved away from the interior surface of the airfoil, the pins permit fluid communication and the seepage and transference of air through the corresponding outer porous skin region and in and out of the corresponding plenum cavity.

5. The passive porosity management device for an airfoil according to claim 1 wherein said means for precluding fluid communication and the seepage and transference of air through the outer porous skin region, and in and out of the corresponding plenum cavity, is comprised of:
  the outer porous skin region of the airfoil being made of a memory material having the characteristics that when the memory material is de-actuated, the memory material has the perforations therethrough, and when the memory material is actuated, the memory material itself closes the perforations.

6. The passive porosity management device for an airfoil according to claim 1 wherein said means for precluding fluid communication and the seepage and transference of air through the outer porous skin region, and in and out of the corresponding plenum cavity, is comprised of:
  a sliding sub-skin disposed below the surface of the outer porous skin region of the airfoil, whereby when the sliding sub-skin is in one position, the perforations in the outer porous skin region are open, and when the sliding sub-skin is shifted, the perforations are closed and thereby preclude the fluid communication and the seepage and transference of air through the outer porous skin region, and in and out of the corresponding plenum cavity.

7. The passive porosity management device for an airfoil according to claim 1 wherein said means for precluding fluid communication and the seepage and transference of air through the outer porous skin region, and in and out of the corresponding plenum cavity, is comprised of:
  a sliding outer-skin disposed above the surface of the outer porous skin region of the airfoil, whereby when the sliding outer-skin is in one position, the perforations in the outer porous skin region are open, and when the sliding outer-skin is shifted, the perforations are closed and thereby preclude the fluid communication and the seepage and transference of air through the outer porous skin region, and in and out of the corresponding plenum cavity.

8. The passive porosity management device for an airfoil according to claim 1 wherein the means for monitoring the amount of fluid communication, and the seepage and transference of air, through the outer porous skin region and in and out of the corresponding plenum cavity, for controlling the means for precluding fluid communication, and the seepage and transference of air, through the outer porous skin region and in and out of the corresponding plenum cavity, is a microprocessor.

9. A passive porosity management device for an airfoil, the airfoil having an outer surface and an interior surface, the passive porosity management device comprising:
  a plurality of outer porous skin regions on the surface of the airfoil;
  a plurality of plenum cavities disposed in the interior of the airfoil in fluid communication with corresponding outer porous skin regions of the airfoil;
  means for monitoring the flow fields on he outer surface of the airfoil;
  means for permitting and stopping the fluid communication and seepage and transference of air through the outer porous skin regions, and in and out of the corresponding plenum cavities; and
  means for modifying the flow fields on the outer surface of the airfoil by controlling and regulating the means for permitting and stopping the fluid communication and seepage and transference of air through the outer porous skin regions, and in and out of the corresponding plenum cavities.

10. The passive porosity management device for an airfoil according to claim 9 wherein said means for precluding fluid communication, and the seepage and transference of air, through the outer porous skin region and in and out of the corresponding plenum cavity, is comprised of:

an impermeable panel disposed in the interior of the airfoil adjacent to the outer porous skin region of the airfoil;

a linear actuator; and a link attachably connecting the impermeable panel to the linear actuator;

whereby when the linear actuator is activated in one direction the impermeable panel contacts the interior of the airfoil adjacent to the corresponding outer porous skin region of the airfoil thereby precluding fluid communication and the seepage and transference of air through the outer porous skin region and in and out of the corresponding plenum cavity, and when the linear actuator is activated in the opposite direction, the impermeable panel moves away from the outer porous skin region of the airfoil thereby permitting fluid communications and the seepage and transference of air through the outer porous skin region and in and out of the corresponding plenum cavity.

11. The passive porosity management device for an airfoil according to claim 9 wherein said means for precluding fluid communication, and the seepage and transference of air, through the outer porous skin region and in and out of the corresponding plenum cavity, is comprised of:

an inflatable bladder disposed in the interior of the airfoil adjacent to the outer porous skin region of the airfoil;

a pump; and a hose having a distal end and a proximal end, the distal end of the hose being fixably attached to the inflatable bladder and the proximal end fixably attached to the pump;

whereby when the pump is energized to force fluid into the bladder, the bladder expands and contacts the interior of the airfoil adjacent to the outer porous skin region of the airfoil thereby precluding fluid communication and the seepage and transference of air through the outer porous skin region and in and out of the corresponding plenum cavity, and when the pump is energized to withdraw fluid from the bladder, the bladder deflates and moves away from the outer porous skin region of the airfoil thereby permitting fluid communication and the seepage and transference of air through the outer porous skin region and in and out of the corresponding plenum cavity.

12. The passive porosity management device for an airfoil according to claim 9 wherein said means for precluding fluid communication and the seepage and transference of air through the outer porous skin region, and in and out of the corresponding plenum cavity, is comprised of:

a plurality of pins disposed in the interior of the airfoil adjacent to the outer porous skin region of the airfoil, wherein each of the pins are aligned with a corresponding perforation in the corresponding outer porous skin region; and     a means to advance and retract the pins to and away from the outer porous skin region of the airfoil;

whereby when the pins are advanced towards the interior surface of the airfoil, the pins preclude fluid communication and the seepage and transference of air through the outer porous skin region, and in and out of the corresponding plenum cavity, and when the pins are moved away from the interior surface of the airfoil, the pins permit fluid communication and the seepage and transference of air through the corresponding outer porous skin region and in and out of the corresponding plenum cavity.

13. The passive porosity management device for an airfoil according to claim 9 wherein said means for precluding fluid communication and the seepage and transference of air through the outer porous skin region, and in and out of the corresponding plenum cavity, is comprised of:

the outer porous skin region of the airfoil being made of a memory material having the characteristics that when the memory material is de-actuated, the memory material has the perforations therethrough, and when the memory material is actuated, the memory material itself closes the perforations.

14. The passive porosity management device for an airfoil according to claim 9 wherein said means for precluding fluid communication and the seepage and transference of air through the outer porous skin region, and in and out of the corresponding plenum cavity, is comprised of:

a sliding sub-skin disposed below the surface of the outer porous skin region of the airfoil, whereby when the sliding sub-skin is in one position, the perforations in the outer porous skin region are open, and when the sliding sub-skin is shifted, the perforations are closed and thereby preclude the fluid communication and the seepage and transference of air through the outer porous skin region, and in and out of the corresponding plenum cavity.

15. The passive porosity management device for an airfoil according to claim 9 wherein said means for precluding fluid communication and the seepage and transference of air through the outer porous skin region, and in and out of the corresponding plenum cavity, is comprised of:

a sliding outer-skin disposed above the surface of the outer porous skin region of the airfoil, whereby when the sliding outer-skin is in one position, the perforations in the outer porous skin region are open, and when the sliding outer-skin is shifted, the perforations are closed and thereby preclude the fluid communication and the seepage and transference of air through the outer porous skin region, and in and out of the corresponding plenum cavity.

16. The passive porosity management device or an airfoil according to claim 9 wherein the means for controlling and regulating the means for permitting and precluding fluid communication and the seepage and transference of air through the outer porous skin region, and in and out of the corresponding plenum cavity, is a microprocessor.

17. A passive porosity management device for an airfoil, the airfoil comprising a leading edge slat having interior and exterior portions, the exterior portion having surfaces, the passive porosity management device comprising:

at least one outer porous skin region on the surface of the leading edge slate;

at least one plenum cavity disposed in the interior portion of the leading edge slat in fluid communication with the outer porous skin region on the surface of the leading edge slat; and     means for monitoring the amount of fluid communication and seepage and transference of air through the outer porous skin region, and in and out of the corresponding plenum cavity;

means for precluding the fluid communication and seepage and transference of air through the outer porous skin region, and in and out of the corresponding plenum cavity;

means for controlling and regulating the means for precluding the fluid communication and seepage and transference of air through the outer porous skin region, and in and out of the corresponding plenum cavity.

18. The passive porosity management device for an airfoil according to claim 17 wherein the means for controlling and regulating the means for precluding the fluid communication and the seepage and transference of air through the outer porous skin region, and in and out of the corresponding plenum cavity, is a microprocessor.

19. A passive porosity management process for an airfoil, the airfoil having an outer surface and an interior surface, comprising:

passively transferring air on the outer surface of the airfoil through an outer porous skin region disposed on the outer surface of the airfoil into at least one plenum cavity disposed in an interior portion of the airfoil;

passively transferring air from at least one plenum cavity disposed in the interior portion of the airfoil through the corresponding outer porous skin region disposed on the outer surface of the airfoil;

monitoring the amount of fluid communication and seepage and transference of air through the outer porous skin region, and in and out of the corresponding plenum cavities; and controlling and regulating the amount of fluid communication and seepage and transference of air through the outer porous skin region, and in and out of the corresponding plenum cavities.

20. A passive porosity management process for an airfoil, the airfoil having an outer surface and an interior surface, comprising:

passively transferring air on the outer surface of the airfoil through an outer porous skin region disposed on the outer surface of the airfoil into at least one plenum cavity disposed in an interior portion of the airfoil;

passively transferring air from at least one plenum cavity disposed in the interior portion of the airfoil through the corresponding outer porous skin region disposed on the outer surface of the airfoil;

monitoring the flow fields caused by the passive transmission of air and producing signals corresponding to the flow fields; and controlling the flow fields caused by the passive transmission of air by controlling the amount of fluid communication and seepage and transference of air through the outer porous skin region, and in and out of the corresponding plenum cavities in relation to the flow field signals.

* * * * *